(12) United States Patent
Park et al.

(10) Patent No.: US 9,557,590 B2
(45) Date of Patent: Jan. 31, 2017

(54) DISPLAY APPARATUS

(71) Applicant: Samsung Display Co., LTD., Yongin, Gyeonggi-Do (KR)

(72) Inventors: Joo-Hyuk Park, Asan-si (KR); Yong-Su Jin, Incheon (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 39 days.

(21) Appl. No.: 14/456,078

(22) Filed: Aug. 11, 2014

(65) Prior Publication Data
US 2015/0253599 A1    Sep. 10, 2015

(30) Foreign Application Priority Data
Mar. 10, 2014    (KR) .................. 10-2014-0027816

(51) Int. Cl.
*G02F 1/1335* (2006.01)
*G02F 1/1333* (2006.01)

(52) U.S. Cl.
CPC ............ *G02F 1/133308* (2013.01); *G02F 2001/133314* (2013.01)

(58) Field of Classification Search
CPC .............. G02F 1/133308; G02F 2201/503
USPC .................................. 349/58, 60
See application file for complete search history.

(56) References Cited

U.S. PATENT DOCUMENTS

| | | | |
|---|---|---|---|
| 8,068,191 B2 | 11/2011 | Choi | |
| 2001/0001416 A1* | 5/2001 | Lee | F28F 3/02 165/80.3 |
| 2004/0032725 A1* | 2/2004 | Hsieh | G02F 1/133604 362/614 |
| 2009/0091878 A1* | 4/2009 | Kawaguchi | G02F 1/133308 361/679.01 |
| 2010/0165244 A1* | 7/2010 | Shin | G02F 1/133308 349/62 |
| 2010/0290248 A1* | 11/2010 | Park | G02B 6/0091 362/606 |
| 2011/0007230 A1* | 1/2011 | Yamamoto | G02F 1/133604 348/794 |
| 2011/0285933 A1* | 11/2011 | Cho | B21D 22/02 349/58 |
| 2011/0292315 A1* | 12/2011 | Bae | G02B 6/0088 349/58 |
| 2011/0292682 A1* | 12/2011 | Yu | G02F 1/133382 362/609 |
| 2013/0044460 A1* | 2/2013 | Jang | G02F 1/133615 362/97.1 |

(Continued)

FOREIGN PATENT DOCUMENTS

| | | |
|---|---|---|
| JP | 2011-023312 A | 2/2011 |
| KR | 1020080067086 A | 7/2008 |

(Continued)

*Primary Examiner* — Sang V Nguyen
(74) *Attorney, Agent, or Firm* — Cantor Colburn LLP

(57) ABSTRACT

A display apparatus includes a display panel, a light source part which generates and provides a light to the display panel, and a receiving container. The receiving container includes a bottom portion under the light source part, and a sidewall extending from the bottom portion. The bottom portion includes a first strength portion and a second strength portion. The first strength portion and the second strength portion have different strengths from each other and are continuously connected to each other.

13 Claims, 6 Drawing Sheets

(56) References Cited

U.S. PATENT DOCUMENTS

| | | | | |
|---|---|---|---|---|
| 2013/0286601 A1* | 10/2013 | Shin | ............... | G02F 1/133308 |
| | | | | 361/728 |
| 2014/0098323 A1* | 4/2014 | Hashimoto | ....... | G02F 1/133608 |
| | | | | 349/58 |
| 2014/0333844 A1* | 11/2014 | Ito | ........................... | H04N 5/64 |
| | | | | 348/794 |
| 2015/0192729 A1* | 7/2015 | Hosoki | ............. | G02F 1/133308 |
| | | | | 348/794 |
| 2015/0226997 A1* | 8/2015 | Tomomasa | ........ | G02F 1/133308 |
| | | | | 348/794 |
| 2015/0277179 A1* | 10/2015 | Nishi | ................... | G02B 6/0088 |
| | | | | 349/58 |
| 2015/0285988 A1* | 10/2015 | Maeyama | ......... | G02F 1/133308 |
| | | | | 362/613 |

FOREIGN PATENT DOCUMENTS

| | | |
|---|---|---|
| KR | 1020090058381 A | 6/2009 |
| KR | 1020110054337 A | 5/2011 |
| KR | 1020120008267 A | 1/2012 |
| KR | 1020120070872 A | 7/2012 |
| KR | 1020130002185 A | 1/2013 |
| KR | 1020130101694 A | 9/2013 |

* cited by examiner

DISPLAY APPARATUS

This application claims priority to Korean Patent Application No. 10-2014-0027816, filed on Mar. 10, 2014, and all the benefits accruing therefrom under 35 U.S.C. §119, the content of which are incorporated by reference herein in its entirety.

BACKGROUND

1. Field

Exemplary embodiments relate to a display apparatus including a receiving container.

2. Description of the Related Art

A liquid display apparatus having a relatively light weight and small size has been manufactured. A cathode ray tube ("CRT") display apparatus has been used due to a good performance and a competitive price. However, the CRT display apparatus has a weakness with a size or portability thereof. Therefore, the liquid crystal display apparatus has been highly regarded due to the relatively small size, light weight and low-power-consumption of the liquid display apparatus.

Generally, the liquid crystal display apparatus applies a voltage to a liquid crystal layer to change the molecular arrangement thereof. The liquid crystal display apparatus displays an image using changes of optical property (for example, birefringence, rotatory polarization, dichroism and light scattering) of a liquid crystal cell according to the changes of the molecular arrangement.

SUMMARY

A liquid crystal display apparatus includes a liquid crystal display panel, and a backlight assembly providing light to the liquid crystal display panel. A receiving container of the liquid crystal display apparatus supports the liquid crystal display panel and the backlight assembly. However, as a size of the liquid crystal display apparatus is increased, a strength of the receiving container may be relatively reduced. Thus, a reinforcing member may be used to improve a strength of a receiving container. However, adding the reinforcing member may cause additional cost and processes.

One or more exemplary embodiment of the invention provides a display apparatus having improved strength.

According to an exemplary embodiment of the invention, a display apparatus includes a display panel, a light source part configured to generate and provide a light to the display panel, and a receiving container configured to receive the display panel and the light source part. The receiving container includes a bottom portion under the light source part, and including a first strength portion and a second strength portion, and a sidewall extending from the bottom portion and defining a receiving space with the bottom portion. The first strength portion and the second strength portion are continuously connected to each other and are configured to have different strengths from each other.

In an exemplary embodiment, the first strength portion and the second strength portion may include different materials from each other.

In an exemplary embodiment, the first strength portion and the second strength portion may include different metals from each other.

In an exemplary embodiment, the first strength portion may include galvanized steel, and the second strength portion may include aluminum.

In an exemplary embodiment, the first strength portion and the second strength portion may be connected to each other by a laser weld.

In an exemplary embodiment, the first strength portion and the second strength portion may each extend in a first direction in a plan view, and may be alternately arranged along a second direction perpendicular to the first direction.

In an exemplary embodiment, a thickness of the first strength portion may be about 1 millimeter (mm) to about 2 millimeters (mm), and a thickness of the second strength portion may be about 0.5 mm to about 1 mm.

In an exemplary embodiment, the first strength portion and the second strength portion may have a flat plate shape.

In an exemplary embodiment, the first strength portion may have a concave shape, and the second strength portion may have a flat plate shape.

In an exemplary embodiment, the first strength portion and the second strength portion may be provided in plural, and may be arranged in a lattice pattern shape in a plan view.

In an exemplary embodiment, the first strength portion and the second strength portion may have a flat plate shape.

In an exemplary embodiment, the first strength portion may have a concave shape, and the second strength portion may have a flat plate shape.

In an exemplary embodiment, a thickness of the first strength portion may be different from a thickness of the second strength portion.

In an exemplary embodiment, the thickness of the first strength portion may be about 1 mm to about 2 mm, and the thickness of the second strength portion may be about 0.5 mm to about 1 mm.

In an exemplary embodiment, the display apparatus may further include a mold frame. The mold frame may include a frame-shaped side part defining an opening portion, and a supporting part which is protruded from the side part to the opening portion and supports the display panel.

In an exemplary embodiment, the light source part may include a light guiding plate, and a light source facing a side surface of the light guiding plate. The light source may be in a space defined by the supporting part of the mold frame, the sidewall of the receiving container and the bottom portion of the receiving container.

In an exemplary embodiment, the light source may be spaced apart from the sidewall of the receiving container.

According to one or more exemplary embodiments of the invention, a receiving container having different materials and different thicknesses may be integrally formed, such that additional cost may be decreased to provide a reinforcing member. Furthermore, a strength of a display apparatus may be improved.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
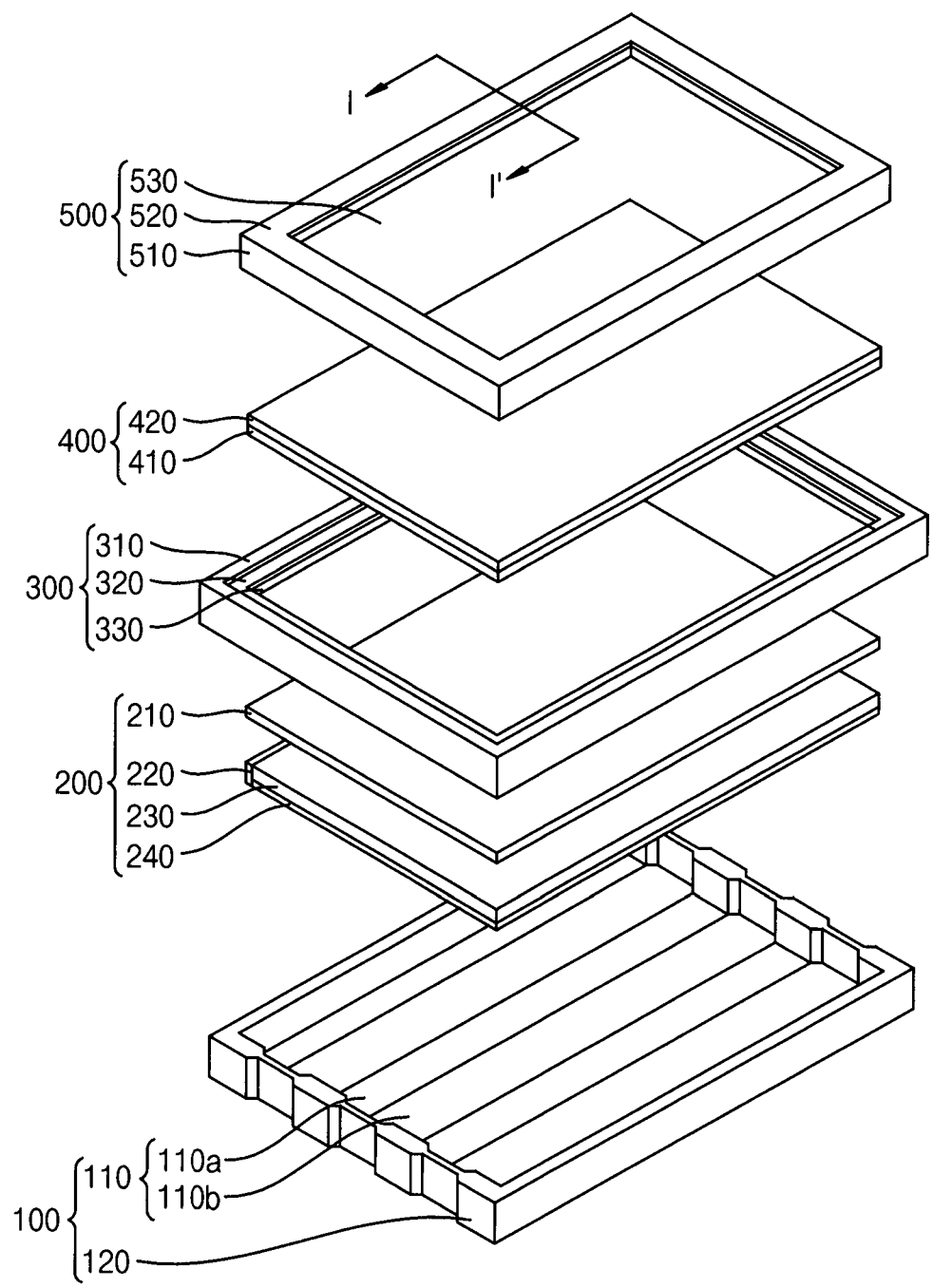
FIG. 1 is an exploded perspective view illustrating an exemplary embodiment of a display apparatus in accordance with the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "attached to" another element or layer, the element or layer can be directly on, connected or attached to another element or layer or intervening elements or layers. In contrast, when an element is referred to as being "directly on," "directly connected to" or "directly attached to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
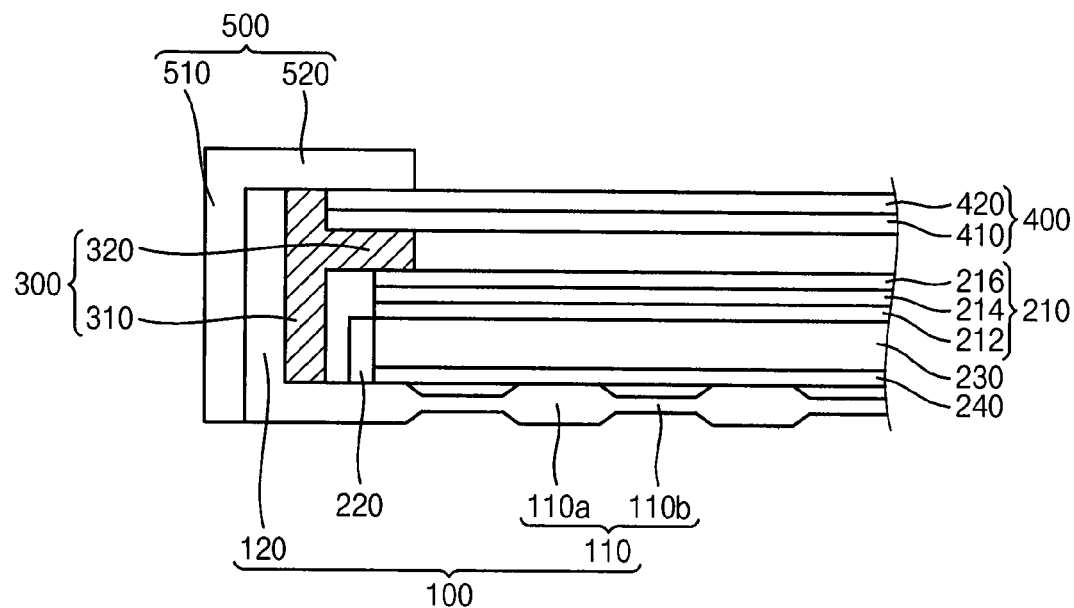
FIG. 2 is a cross-sectional view taken along line I-I' of FIG. 1.

FIG. 1 is an exploded perspective view illustrating an exemplary embodiment of a display apparatus in accordance with the invention. FIG. 2 is a cross-sectional view taken along line I-I' of FIG. 1.

Referring to FIGS. 1 and 2, a display apparatus includes a covering member 500, a display panel 400, a mold frame 300, a backlight assembly 200 and a receiving container 100.

The covering member 500 may include a side cover 510 and a top cover 520. The top cover 520 may extend from the side cover 510 to cover a portion of the display panel 400 and to define a first opening part 530. An image provided from the display panel 400 may be displayed through the first opening part 530.

The display panel 400 displays an image using light from the backlight assembly 200 according to driving signals applied from an external device (not shown). The display panel 400 includes an array substrate 410, an opposite substrate 420 facing the array substrate 410, and a liquid crystal layer (not shown) disposed between the array substrate 410 and the opposite substrate 420.

The array substrate 410 may include a plurality of gate lines, a plurality of data lines crossing the gate lines, and a plurality of switching elements connected to the gate and data lines. The opposite substrate 420 may include a black matrix blocking light and a color filter having a color. Although the opposite substrate 420 includes the color filter in the exemplary embodiment, the color filter may be disposed in the array substrate 410 in an alternative exemplary embodiment. The liquid crystal layer is disposed between the array substrate 410 and the opposite substrate 420. The liquid crystal layer includes liquid crystal molecules that are optically anisotropic. The liquid crystal molecules are driven by electric field, so that light may pass through the liquid crystal layer or may be blocked, to display an image.

The display panel 400 may be electrically connected to a driving part (not shown) to drive the display panel 400. In an exemplary embodiment, for example, the driving part may be a flexible printed circuit board, but the invention is not limited thereto. The driving part may be electrically connected to the array substrate 410. The driving part may be disposed under of the backlight assembly 200 and/or on a side surface of the backlight assembly 200.

The mold frame 300 may have a frame shape to define a second opening part 330. The mold frame 300 may include a side part 310, and a supporting part 320 protruding inwardly from the side part 310 to form the second opening part 330 and to support the display panel 400. The mold frame 300 may be disposed in the receiving container 100. An optical element 210 is disposed under the supporting part 320. The optical element 210 will be described later. The light generated by the backlight assembly 200 may be provided to the display panel 400 through the second opening part 330.

The backlight assembly 200 includes a light guiding plate 230, the optical element 210 and a light source 220. The backlight assembly 200 generates light to provide the light to the display panel 400.

The light guiding plate 230 guides the light from the light source 220 to the display panel 400. The light guiding plate 230 converts an incident light having a light distribution of a point light source or a line light source to an exiting light having a light distribution of a surface light source. Thus, the light guiding plate 230 guides the light from the light source 220 toward the display panel 400. Although the light guiding plate 230 is described having a uniform thickness in the exemplary embodiment, the light guiding plate 230 may have various shapes in alternative exemplary embodiments. In an exemplary embodiment, for example, the light guiding plate 230 may have a wedge-shaped cross-section. In an exemplary embodiment, for example, a cross-sectional thickness of the light guiding plate 230 may be reduced as a distance from the light source 220 increases, to form the wedge-shaped cross-section.

The optical element 210 is disposed on the light guiding plate 230. The optical element 210 may improve optical properties of the light from the light guiding plate 230. Thus, the optical element 210 may equalize brightness of the light from the light guiding plate 230. The optical element 210 may include a plurality of optical sheets. In an exemplary embodiment, for example, the optical element 210 may include a protecting sheet 216, a prism sheet 214 and a diffusion sheet 212. The diffusion sheet 212 is disposed on a light exiting surface of the light guiding plate 230. The prism sheet 214 is disposed on the diffusion sheet 212. The protecting sheet 216 is disposed on the prism sheet 214. The prism sheet 214 may include a plurality of prism sheets such as an upper prism sheet and a lower prism sheet. An extension axis of prisms of the upper prism sheet may be substantially perpendicular to an extension axis of prisms of the lower prism sheet. Although the optical element 210 is described including the protecting sheet 216, the prism sheet 214 and the diffusion sheet 212, various modifications of the optical sheet may be possible in an alternative exemplary embodiment.

The light source 220 generates light to provide the light to the light guiding plate 230. The light source 220 is disposed adjacent to a first side surface of the light guiding plate 230, such as an incident side surface of the light guiding plate 230. The light source 220 may include a plurality of light emitting diode ("LED") light sources, and may be a spot (e.g., point) light source or a line light source generating the light.

The backlight assembly 200 may further include a reflecting plate 240. The reflecting plate 240 may reflect the light, which is incident on a lower surface opposite to the light exiting surface, to the display panel 400, so that luminance efficiency may be improved.

Figure 3:
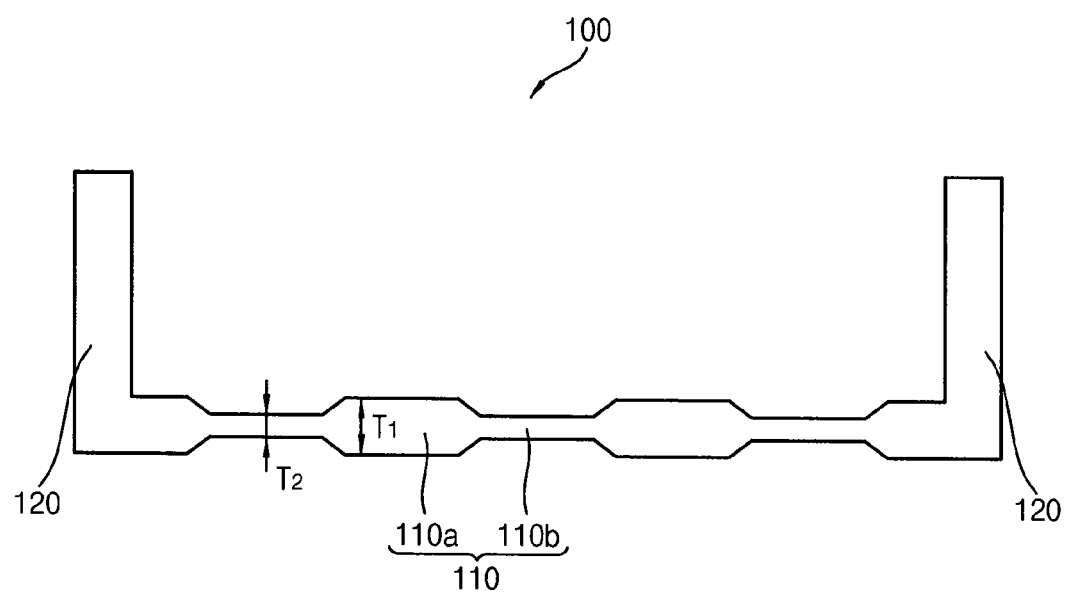
FIG. 3 is a cross-sectional view illustrating an exemplary embodiment of a receiving container in accordance with the invention.

FIG. 3 is a cross-sectional view illustrating an exemplary embodiment of a receiving container in accordance with the invention.

Referring to FIGS. 2 and 3, the receiving container 100 is configured to receive the backlight assembly 200 and the display panel 400. The receiving container 100 may include a metal material. In an exemplary embodiment, for example, the receiving container 100 may include aluminum or aluminum alloy. The receiving container 100 includes a bottom portion 110 and a first sidewall 120. The first sidewall 120 extends from a first side of the bottom portion 110 along a direction perpendicular to the bottom portion 110.

The bottom portion 110 includes a first strength portion 110a and a second strength portion 110b. The first strength portion 110a may include a different material from the second strength portion 110b, but the invention is not limited thereto.

In an exemplary embodiment, for example, the first strength portion 110a may include galvanized steel and the second strength portion 110b may include aluminum. In an exemplary embodiment, for example, galvanized steel plates and aluminum steel plates are alternately arranged in a row direction. In an exemplary embodiment of manufacturing a display apparatus, contacting portions between the galvanized steel plates and the aluminum steel plates are attached to each other, such as by laser welding, and are pressed to integrally form the receiving container 100. More detail description will be described with reference to FIGS. 8 to 10.

In an exemplary embodiment, the first strength portion 110a and the second strength portion 110b may each extend to be elongated in a first direction in a plan view, and the first strength portion 110a and the second strength portion 110b may be alternately arranged along a second direction perpendicular to the first direction. The first strength portion 110a and the second strength portion 110b may be alternately arranged only along the second direction, but the invention is not limited thereto.

In an exemplary embodiment, the first strength portion 110a of the receiving container 100 may have a flat plate shape.

The first strength portion 110a may have a first cross-sectional thickness T1, and the second strength portion 110b may have a second cross-sectional thickness T2 smaller than the first thickness T1. In an exemplary embodiment, for example, a cross-sectional thickness of the first strength portion 110a may be about 1 mm to about 2 millimeters (mm), and a cross-sectional thickness of the second strength portion 110b may be about 0.5 millimeter (mm) to about 1 mm. The first strength portion 110a may serve to improve a strength of the display apparatus.

The first strength portion 110a may be defined by protruding portions extending in opposing directions from a main portion thereof. The main portion may be coplanar with the second strength portion 110b, but the invention is not limited thereto.

In an exemplary embodiment, the first strength portion 110a may include a same material as the second strength portion 110b. In an exemplary embodiment, for example, the first strength portion 110a and the second strength portion 110b may each include aluminum or aluminum alloy. Although the first strength portion 110a includes a same material as the second strength portion 110b, the first strength portion 110a may have different strength from the second strength portion 110b depending on difference of composition ratio thereof.

A lower surface of the supporting part 320 covers a portion of an upper surface of the backlight assembly 200, and makes contact with the backlight assembly 200. Thus, the lower surface of the supporting part 320 makes contact with an upper surface of the protecting sheet 216. In addition, a lower surface of the backlight assembly 200 makes contact with the bottom portion 110 of the receiving container 100. Thus, the backlight assembly 200 may be fixed in the receiving container 100.

The light source 220 is spaced apart from the first sidewall 120 of the receiving container 100 by a distance. Thus, when the liquid crystal display apparatus is assembled, the mold frame 300 may be inserted into a space defined between the backlight assembly 200 and the first sidewall 120 of the receiving container 110.

In addition, although the light source 220 is spaced apart from the first sidewall 120 in the illustrated exemplary embodiment, the light source 220 may contact the first sidewall 120 in an alternative exemplary embodiment.

Although the display apparatus includes the reflecting plate 240 in the illustrated exemplary embodiment, the receiving container 100 may include a metal material having relatively high reflectivity, so that the receiving container 100 may reflect light from the light source 220 toward the sidewall of the receiving container 100 without the additional reflecting plate 240. In addition, heat generated from the light source 220 may be effectively dissipated through the receiving container 100. In addition, the receiving container 100 may reflect light, which is incident on a lower surface of the light guiding plate 230, to the light guiding plate 230 without an additional reflecting element under the light guiding plate 230.

Figure 4:
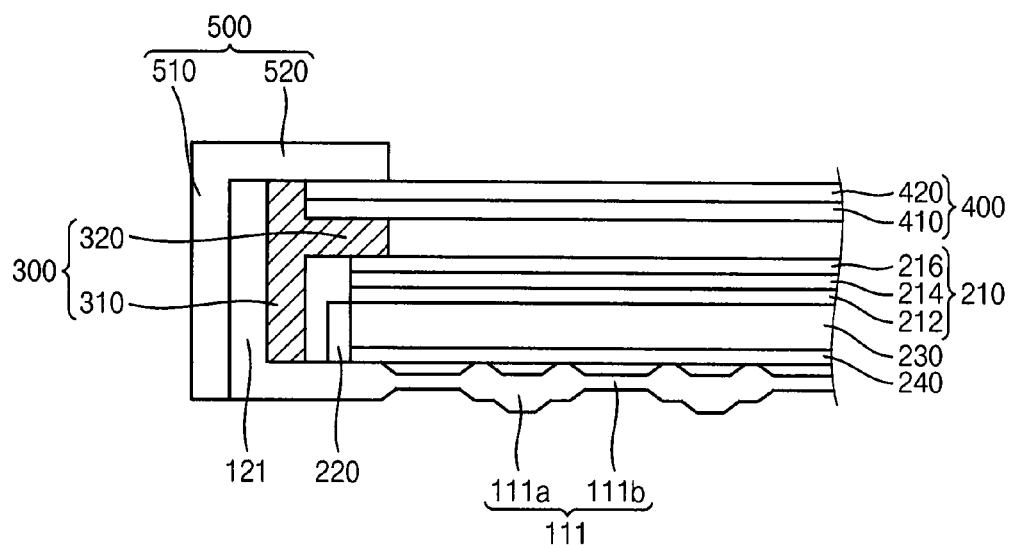
FIG. 4 is a cross-sectional view illustrating another exemplary embodiment of a display apparatus in accordance with the invention.
Figure 5:
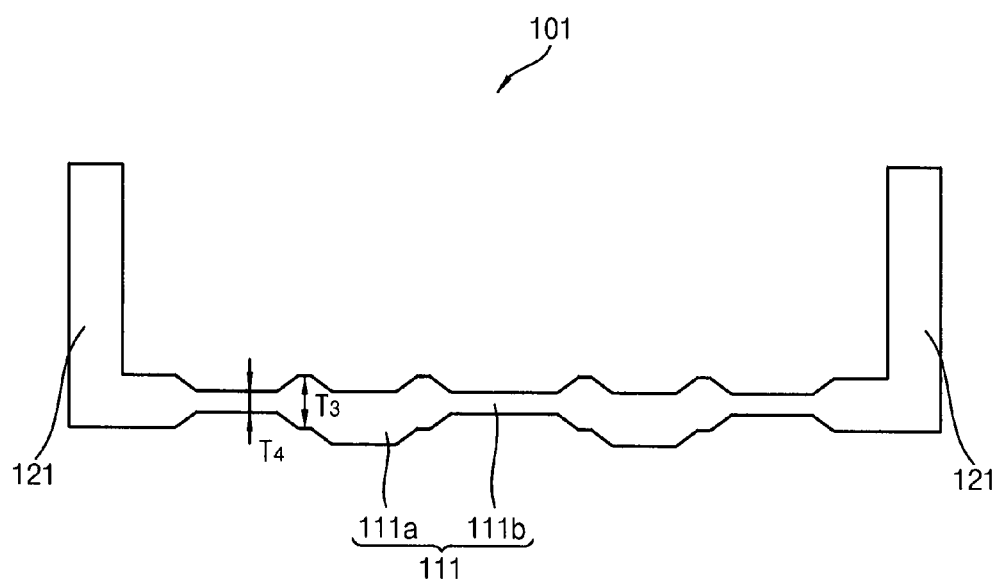
FIG. 5 is a cross-sectional view illustrating another exemplary a receiving container in accordance with the invention.

FIG. 4 is a cross-sectional view illustrating another exemplary embodiment of a display apparatus in accordance with the invention. FIG. 5 is a cross-sectional view illustrating another exemplary embodiment of a receiving container in accordance with the invention.

Referring to FIGS. 4 and 5, the display apparatus is substantially same as the display apparatus of FIGS. 1 and 2, except for a receiving container 101. Thus, any further detailed descriptions concerning the same elements will be omitted.

Referring to FIGS. 4 and 5, the receiving container 101 receives a backlight assembly 200 and a display panel 400. The receiving container 101 may include a metal material. In an exemplary embodiment, for example, the receiving container 101 may include aluminum or aluminum alloy. The receiving container 101 includes a bottom portion 111 and a first sidewall 121. The first sidewall 121 extends from a first side of the bottom portion 111 along a direction perpendicular to the bottom portion 111.

The bottom portion 111 includes a first strength portion 111a and a second strength portion 111b. The first strength portion 111a may include a different material from the second strength portion 111b, but the invention is not limited thereto.

In an exemplary embodiment, for example, the first strength portion 111a may include galvanized steel and the second strength portion 111b may include aluminum. In an exemplary embodiment, for example, galvanized steel plates and aluminum steel plates are alternately arranged in a row direction. In an exemplary embodiment of manufacturing a display apparatus, contacting portions between the galvanized steel plates and the aluminum steel plates are attached to each other, such as by laser welding, and are pressed to integrally form the receiving container 101.

In an exemplary embodiment, the first strength portion 111a and the second strength portion 111b may each extend to be elongated in a first direction in a plan view, and the first strength portion 111a and the second strength portion 111b may be alternately arranged along a second direction perpendicular to the first direction. The first strength portion 111a and the second strength portion 111b may be alternately arranged only along the second direction, but the invention is not limited thereto.

In an exemplary embodiment, the first strength portion 111a of the receiving container 101 may have an overall concave shape.

The first strength portion 111a may have a third cross-sectional thickness T3, and the second strength portion 111b may have a fourth cross-sectional thickness T4 smaller than the third thickness T3. In an exemplary embodiment, for example, a cross-sectional thickness of the first strength portion 111a may be about 1 mm to about 2 mm, and a cross-sectional thickness of the second strength portion 111b may be about 0.5 mm to about 1 mm. The first strength portion 111a may serve to improve a strength of the display apparatus.

The third thickness T3 of the first strength portion 111a may be defined by protruding portions extending in opposing directions from a main portion thereof. The main portion may be coplanar with the second strength portion 110b, but the invention is not limited thereto. The third thickness T3 portions of the first strength portion 111a may be adjacent and extend from the fourth thickness T4 portion of the second strength portion 111b.

In an exemplary embodiment, the first strength portion 111a may include a same material as the second strength portion 111b. In an exemplary embodiment, for example, the first strength portion 111a and the second strength portion 111b may include aluminum or aluminum alloy. Although the first strength portion 111a includes a same material as the second strength portion 111b, the first strength portion 111a may have different strength from the second strength portion 111b depending on difference of composition ratio thereof.

A lower surface of the supporting part 320 covers a portion of an upper surface of the backlight assembly 200, and makes contact with the backlight assembly 200. Thus, the lower surface of the supporting part 320 makes contact with an upper surface of the protecting sheet 216. In addition, a lower surface of the backlight assembly 200 makes contact with the bottom portion 111 of the receiving container 101. Thus, the backlight assembly 200 may be fixed in the receiving container 101.

Figure 6:
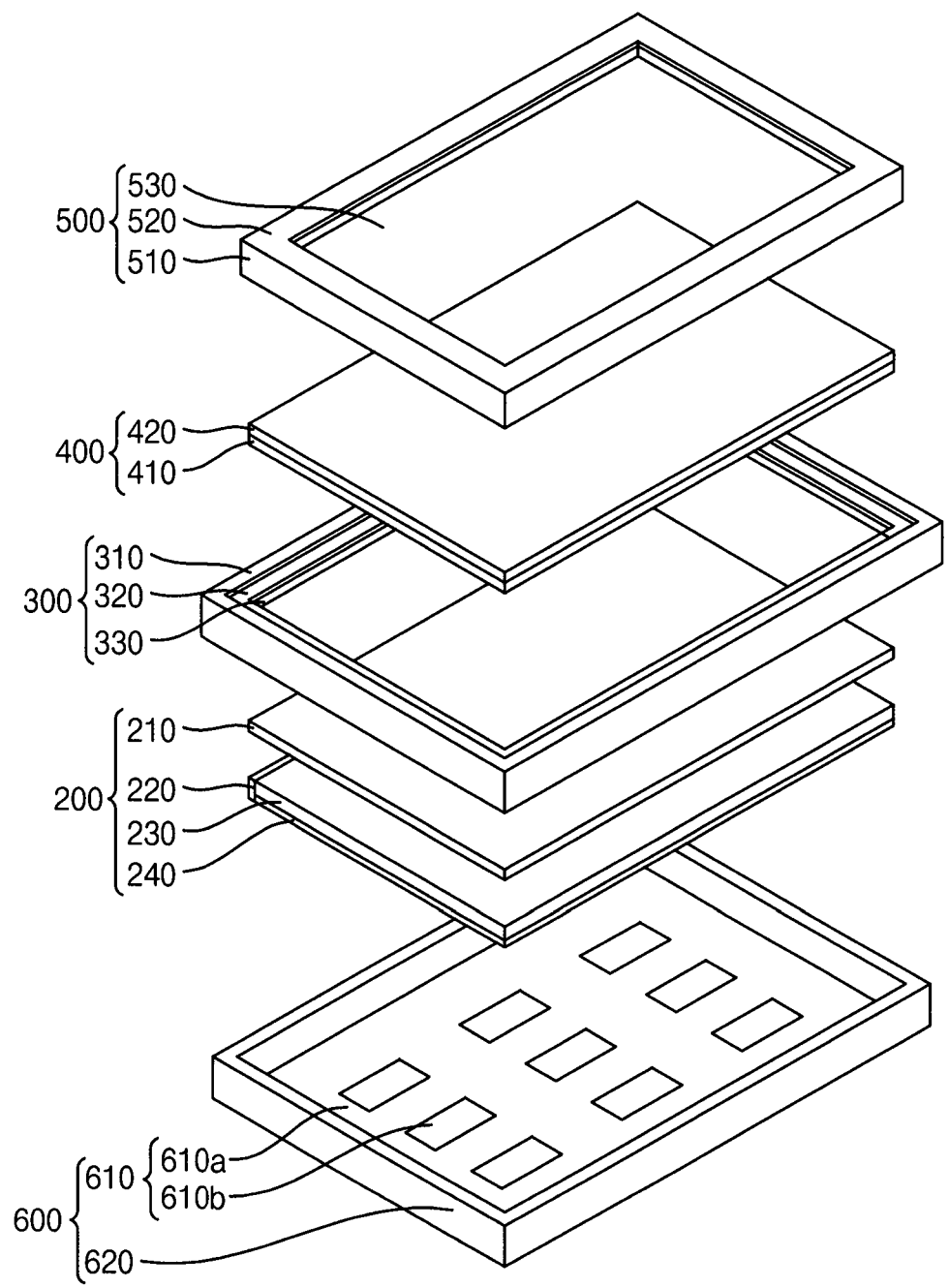
FIG. 6 is an exploded perspective view illustrating still another exemplary embodiment of a display apparatus in accordance with the invention.
Figure 7:
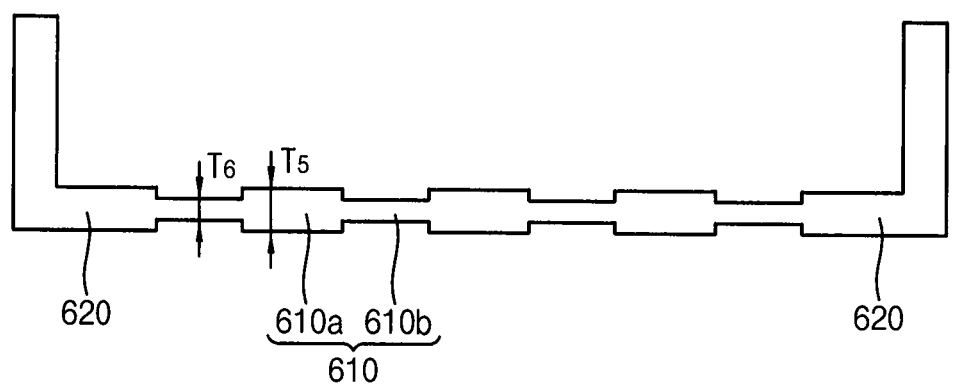
FIG. 7 is a cross-sectional view illustrating still another exemplary embodiment of a receiving container in accordance with the invention.

FIG. 6 is an exploded perspective view illustrating still another exemplary embodiment of a display apparatus in accordance with the invention. FIG. 7 is a cross-sectional view illustrating still another exemplary embodiment of a receiving container in accordance with the invention.

Referring to FIGS. 6 and 7, the display apparatus is substantially same as the display apparatus of FIGS. 1 and 2, except for a receiving container 600. Thus, any further detailed descriptions concerning the same elements will be omitted.

Referring to FIGS. 6 and 7, the receiving container 600 receives a backlight assembly 200 and a display panel 400. The receiving container 600 may include a metal material. In an exemplary embodiment, for example, the receiving container 600 may include aluminum or aluminum alloy. The receiving container 600 includes a bottom portion 610 and a first sidewall 620. The first sidewall 620 extends from a first side of the bottom portion 610 along a direction perpendicular to the bottom portion 610.

The bottom portion 610 includes a first strength portion 610a and a second strength portion 610b. The first strength portion 610a may include a different material from the second strength portion 610b, but the invention is not limited thereto.

In an exemplary embodiment, for example, the first strength portion 610a may include galvanized steel, and the second strength portion 610b may include aluminum. In an exemplary embodiment, for example, galvanized steel plates and aluminum steel plates are alternately arranged in a row direction. In an exemplary embodiment of manufacturing a display apparatus, contacting portions between the galvanized steel plates and the aluminum steel plates are attached to each other such as by laser welding, and are pressed to integrally form the receiving container 600.

In an exemplary embodiment, the first strength portion 610a and the second strength portion 610b of the receiving container 600 may form an overall lattice pattern shape of the bottom portion 610. That is, the first strength portion 610a and the second strength portion 610b are alternately arranged along both first and second directions.

In an exemplary embodiment, the first strength portion 610a and the second strength portion 610b of the receiving container 600 may have a flat plate shape. A shape of the first strength portion may have inclined surfaces extending from the second strength portion (FIG. 2 and FIG. 3) or the first strength portion may have surfaces substantially perpendicular to the second strength portion (FIG. 7), but the invention is not limited thereto.

In an exemplary embodiment, the first strength portion 610a and the second strength portion 610b of the receiving container 600 may have a concave shape, such as that illustrated in FIG. 4 and FIG. 5.

The first strength portion 610a may have a fifth cross-sectional thickness T5, and the second strength portion 610b may have a sixth cross-sectional thickness T6 smaller than the fifth thickness T5. In an exemplary embodiment, for example, a cross-sectional thickness of the first strength portion 610a may be about 1 mm to about 2 mm, and a cross-sectional thickness of the second strength portion 610b may be about 0.5 mm to about 1 mm. The first strength portion 610a may serve to improve a strength of the display apparatus.

In an exemplary embodiment, the first strength portion 610a may include a same material as the second strength portion 610b. In an exemplary embodiment, for example, the first strength portion 610a and the second strength portion 610b may include aluminum or aluminum alloy. Although the first strength portion 610a includes a same material as the second strength portion 610b, the first strength portion 610a may have different strength from the second strength portion 610b depending on difference of composition ratio.

A lower surface of the supporting part 320 covers a portion of an upper surface of the backlight assembly 200, and makes contact with the backlight assembly 200. Thus, the lower surface of the supporting part 320 makes contact with an upper surface of the protecting sheet 216. In addition, a lower surface of the backlight assembly 200 makes contact with the bottom portion 610 of the receiving container 600. Thus, the backlight assembly 200 may be fixed in the receiving container 600.

Figure 8:
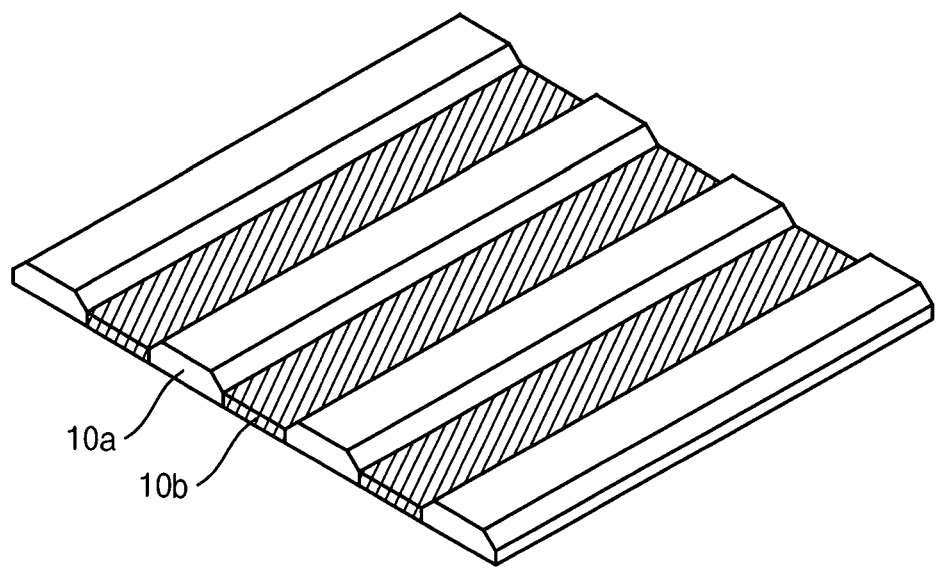
FIGS. 8 to 10 are perspective views to explain an exemplary embodiment of a method for manufacturing a receiving container of the display apparatus of FIG. 1.
Figure 9:
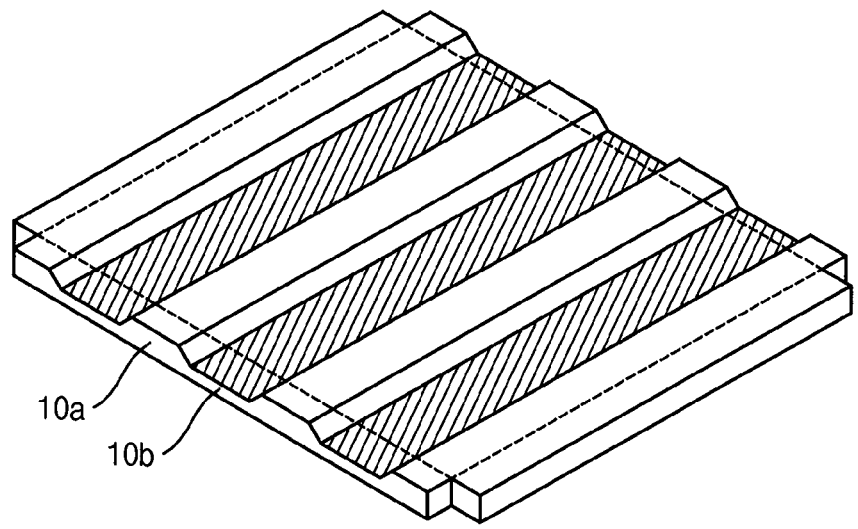
Figure 10:
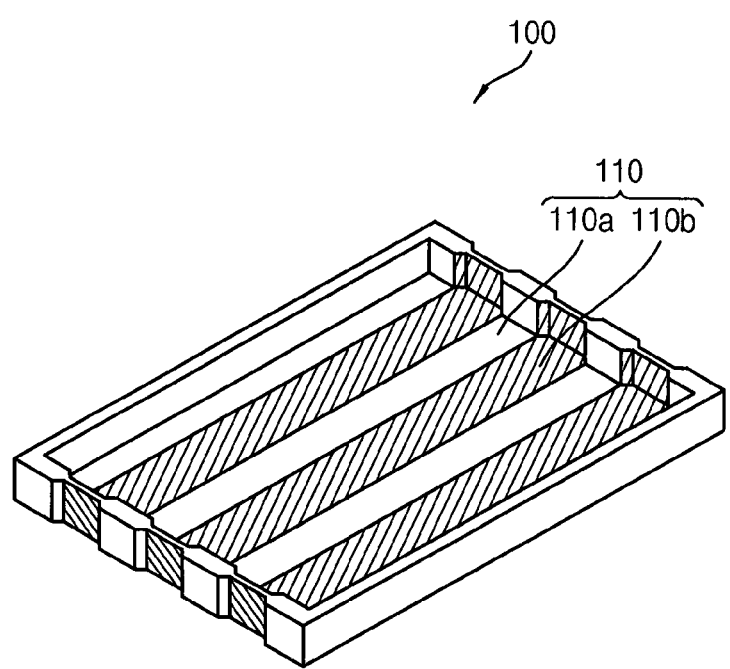

FIGS. 8 to 10 are perspective views to explain an exemplary embodiment of a method for manufacturing a receiving container of the display apparatus of FIG. 1.

Referring to FIG. 8, for example, an elongated galvanized steel plate 10a and an elongated aluminum steel plate 10b are arranged in a row direction. The galvanized steel plate 10a may have a different cross-sectional thickness from the aluminum steel plate 10b. Contacting portions between the galvanized steel plate 10a and the aluminum steel plate 10b are attached to each other, such as by laser welding.

Referring to FIGS. 9 and 10, for example, a pressure is applied to welded galvanized and aluminum steel plates 10a and 10b to form a flat welded plate member. Outermost edges of the flattened welded plate member, e.g., opposing edges of the overall galvanized steel plate 10a of the welded plate member, are removed such as by cutting. Notches may be formed at the corners of the welded plate member from the cutting, as illustrated in FIG. 9.

Edge portions of the flattened galvanized steel plate 10a and flattened the aluminum steel plate 10b are deformed such as by bending along the dotted line shown in FIG. 9, to form the first sidewall 120 along a dotted line. The first sidewall 120 of the receiving container 110 may collective include two pairs of parallel sidewall portions. Thus, a receiving container 100 including a bottom portion 110 in which a first strength portion 110a formed from the galvanized steel plate 10a and a second strength portion plate 110b formed from the aluminum steel 10b, and the first sidewall 120, are integrally formed with each other. That is the first sidewall 120 is continuous with the bottom portion 110.

According to one or more exemplary embodiment of the invention, a receiving container including different materials and a different thicknesses may be integrally formed, such that cost may be decreased to provide a reinforcing member. Furthermore, a strength of a display apparatus may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus, comprising:
a display panel;
a light source part configured to generate and provide a light to the display panel; and
a receiving container configured to receive the display panel and the light source part, defining:
    a bottom portion thereof under the light source part, and
    a sidewall extending from the bottom portion and defining a receiving space with the bottom portion,
the bottom portion defining:
    first strength portions thereof within the sidewall and having a first thickness, and
    second strength portions thereof within the sidewall, extending in a first direction and alternated with the first strength portions in a second direction which crosses the first direction, the second strength portions having a second thickness larger than the first thickness of the first strength portions,
wherein
    the first strength portions and the second strength portions are continuously connected to each other and entirely include a same material,
    a main thickness portion is defined in a thickness direction of the bottom portion and common to both the first and second strength portions, and
    the second strength portions are defined by protruded portions of the bottom portion extending in opposite directions from the main thickness portion, in the thickness direction of the bottom portion.

2. The display apparatus of claim 1, wherein a connection between the continuously connected first strength portions and second strength portions is a laser weld.

3. The display apparatus of claim 1, wherein
the second thickness is about 1 millimeter to about 2 millimeters and
the first thickness is about 0.5 millimeter to about 1 millimeter.

4. The display apparatus of claim 3, wherein the first strength portions and the second strength portions have a flat plate shape.

5. The display apparatus of claim 3, wherein
the second strength portions have a concave shape, and
the first strength portions have a flat plate shape.

6. The display apparatus of claim 1, wherein the first strength portions and the second strength portions within the sidewall, are arranged alternating with each other within the sidewall to define a lattice pattern shape in a plan view.

7. The display apparatus of claim 6, wherein the first strength portions and the second strength portions have a flat plate shape.

8. The display apparatus of claim 6, wherein
the second strength portions have a concave shape, and
the first strength portions have a flat plate shape.

9. The display apparatus of claim 1, further comprising a mold frame which is disposed within the receiving space defined in the receiving container,
wherein the mold frame comprises:
    a frame-shaped side part which is extended along the sidewall of the receiving container and defines an opening portion; and
    a supporting part which is protruded from the side part to the opening portion, and supports the display panel.

10. The display apparatus of claim 9, wherein
the light source part comprises: a light guiding plate, and a light source facing a side surface of the light guiding plate, and
the light source is disposed in a space defined by the supporting part of the mold frame, the sidewall of the receiving container and the bottom portion of the receiving container.

11. The display apparatus of claim 10, wherein the light source is spaced apart from the sidewall of the receiving container.

12. The display apparatus of claim 1, wherein
the sidewall comprises first sidewalls lengthwise extended in the first direction and second sidewalls lengthwise extended in the second direction, and
each of the first strength portions and the second strength portions of the bottom portion are bent to define the first and second sidewalls.

13. A display apparatus, comprising:
a display panel;
a light source part configured to generate and provide a light to the display panel; and
a receiving container configured to receive the display panel and the light source part, defining:
    a bottom portion thereof under the light source part, and
    a sidewall extending from the bottom portion and defining a receiving space with the bottom portion, the sidewall comprising first sidewalls lengthwise extended in a first direction and second sidewalls lengthwise extended in a second direction crossing the first direction,
wherein the bottom portion defines:
    first strength portions thereof provided in plural and lengthwise extended in the first direction within the first and second sidewalls, and
    second strength portions thereof provided in plural, lengthwise extended in the first direction and alternated with the first strength portions within the first and second sidewalls,
wherein the first strength portions and the second strength portions of the bottom portion are each bent to define the first and second sidewalls and are continuously connected to each other to define different strengths from each other.

* * * * *